United States Patent
Scotford et al.

(10) Patent No.: US 12,280,864 B2
(45) Date of Patent: *Apr. 22, 2025

(54) DOOR ASSEMBLY AND SEAT UNIT

(71) Applicant: Adient Aerospace, LLC, Bothell, WA (US)

(72) Inventors: Timothy Scotford, Monmouthshire (GB); Kyle Bettenhausen, Laguna Hills, CA (US); Paul Morgan, Nantyglo (GB); Matthew Vu Hoang, Westminster, CA (US)

(73) Assignee: Adient Aerospace, LLC, Bothell, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/352,317

(22) Filed: Jul. 14, 2023

(65) Prior Publication Data

US 2024/0025531 A1    Jan. 25, 2024

Related U.S. Application Data

(63) Continuation of application No. 17/121,083, filed on Dec. 14, 2020, now Pat. No. 11,738,852.

(60) Provisional application No. 62/947,907, filed on Dec. 13, 2019.

(51) Int. Cl.
*B64C 1/14* (2006.01)
*E05D 15/06* (2006.01)

(52) U.S. Cl.
CPC ........ *B64C 1/1438* (2013.01); *E05D 15/0621* (2013.01); *E05Y 2900/502* (2013.01); *E05Y 2900/531* (2013.01)

(58) Field of Classification Search
CPC .............. B64C 1/1438; E05D 15/0621; E05Y 2900/502; E05Y 2900/531
See application file for complete search history.

(56) References Cited

U.S. PATENT DOCUMENTS

| | | |
|---|---|---|
| 5,967,595 A | 10/1999 | Heya et al. |
| 2010/0095595 A1 | 4/2010 | Hanaki et al. |
| 2010/0289299 A1 | 11/2010 | Kitayama |
| 2016/0298370 A1 | 10/2016 | Druckman |
| 2017/0283064 A1 | 10/2017 | Robinson |
| 2021/0108455 A1 | 4/2021 | Yun |
| 2023/0287720 A1* | 9/2023 | Hoang ................ E05D 15/0652 |

FOREIGN PATENT DOCUMENTS

WO    2021084249 A1    5/2021

* cited by examiner

*Primary Examiner* — Rodney A Bonnette
(74) *Attorney, Agent, or Firm* — Yee & Associates, P.C.

(57) ABSTRACT

A door assembly for a seat unit provided within a vehicle cabin, in particular an aircraft cabin, the door assembly comprising at least a fixed base structure, a door element movably mounted on the base structure and which is movable between a fully retracted position and at least one deployed position, and a door slide device provided between the base structure and the door element to movably support the door element on the base structure. Further, the door slide device comprises at least a slide carrier bracket fixed to the base structure or the door element, at least one slide unit which is coupled to the slide carrier bracket in a normal operation mode, and at least one separate auxiliary slide arrangement.

20 Claims, 18 Drawing Sheets

DOOR ASSEMBLY AND SEAT UNIT

CROSS REFERENCE TO RELATED APPLICATIONS

This application is a Continuation of U.S. application Ser. No. 17/121,083 filed on Dec. 14, 2020, which claims priority to U.S. Provisional Patent Application No. 62/947,907 filed Dec. 13, 2019, the entire disclosures of which are hereby incorporated by reference herein.

BACKGROUND OF THE INVENTION

Field of the Invention

The present invention relates to a door assembly for a seat unit provided within a vehicle cabin, in particular an aircraft cabin. Further, the present disclosure relates generally to a seat unit having such a door assembly.

Description of the Background Art

Door assemblies for seat units within a vehicle cabin, such as cabins of passenger transportation vehicles, are provided to improve privacy for passengers. For example, the door assemblies may provide a privacy screen, a movable wall or a sliding door to divide a seat from a cabin aisle of the vehicle cabin.

SUMMARY OF THE INVENTION

The disclosed examples are described in detail below with reference to the accompanying drawing figures listed below. The following summary is provided to illustrate examples or implementations disclosed herein. It is not meant, however, to limit all examples to any particular configuration or sequence of operations.

In an exemplary embodiment, provided herein is a door assembly for a seat unit provided within a vehicle cabin, in particular an aircraft cabin, the door assembly comprising at least a fixed base structure, a door movably mounted on the base structure and which is movable between a fully retracted position and at least one deployed position, and a door slide device provided between the base structure and the door to movably support the door on the base structure. Further, the door slide device comprises at least a slide carrier bracket fixed to the base structure or the door, at least one slide unit which is coupled to the slide carrier bracket in a normal operation mode, and at least one separate auxiliary slide arrangement, wherein, for example, in case of de-coupling of the slide unit from the slide carrier bracket via a force exertion on the door, the door is movably supported on the separate auxiliary slide arrangement.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limiting of the present invention, and wherein.

DETAILED DESCRIPTION

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

Figure 1A:
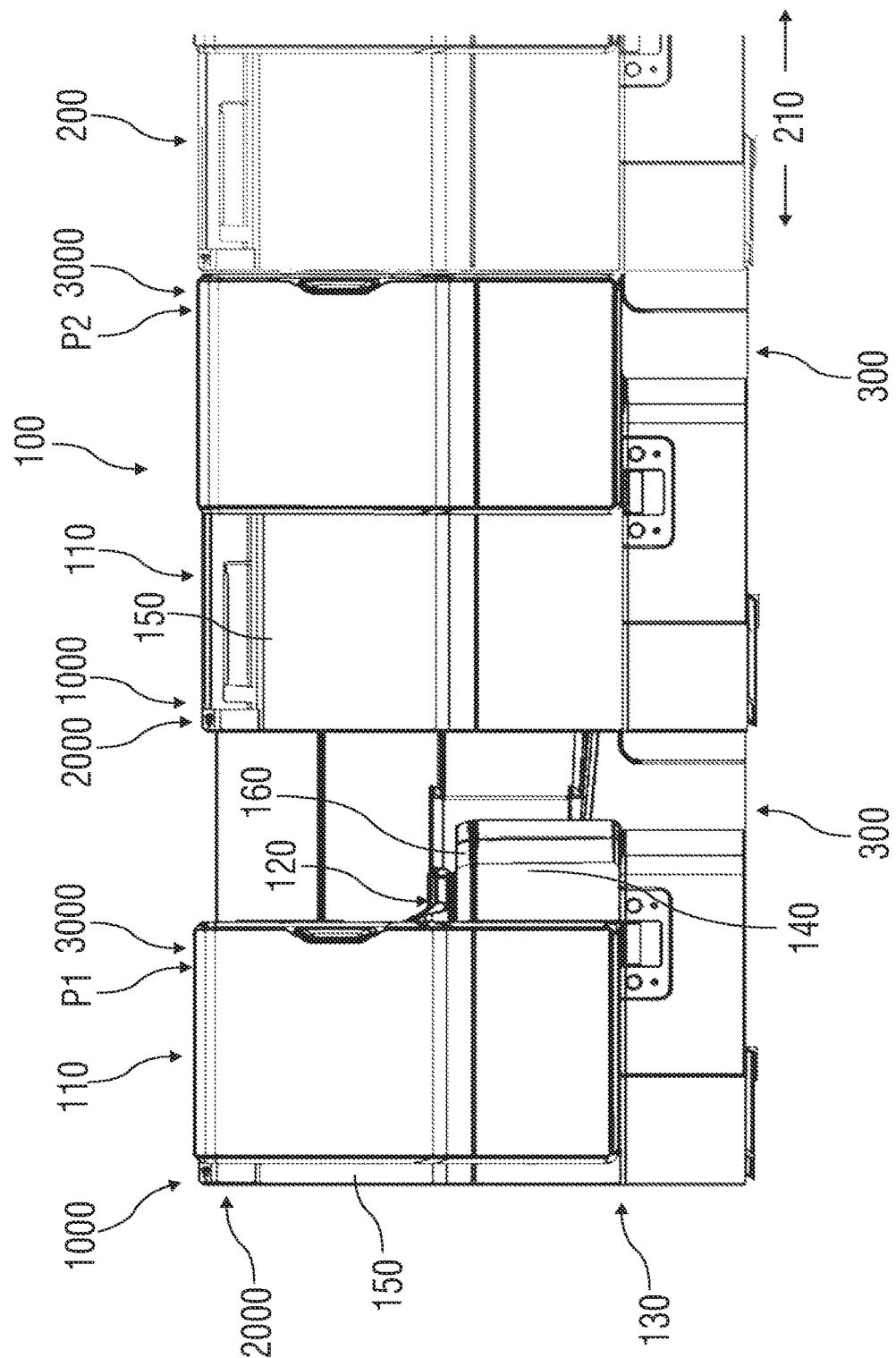
FIGS. 1A and 1B show schematically in a side view and a top view, an embodiment of a passenger seating arrangement.
Figure 1B:
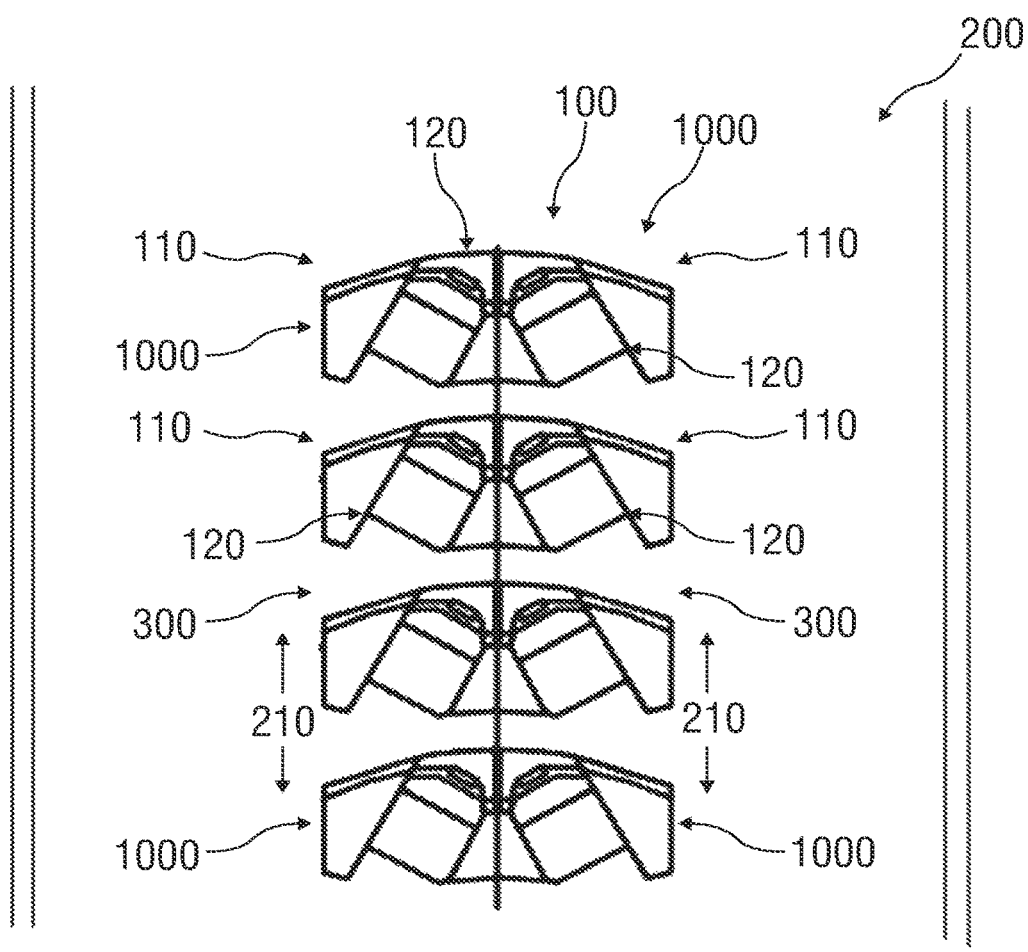
Figure 10:
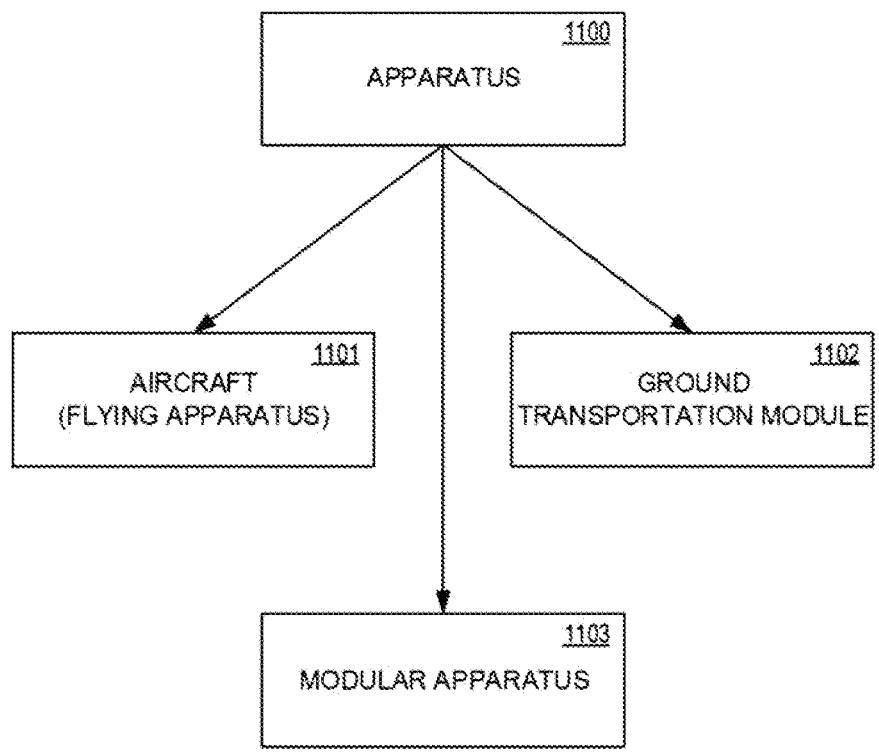
FIG. 10 is a block diagram of an apparatus for which various aspects.

FIGS. 1A and 1B show schematically in a side view and a top view an embodiment of a passenger seating arrangement 100. The passenger seating arrangement 100 is, for example, arranged within a vehicle cabin 200 of an apparatus 1100 as shown in FIG. 10. In the illustrated examples, the vehicle cabin 200 is an aircraft cabin. However any other passenger transportation vehicle or cabin is contemplated.

The passenger seating arrangement 100 comprises a plurality of seat units 110 arranged within the vehicle cabin 200. For example, the seat units 110 are arranged one behind another along a longitudinal extension direction of the vehicle cabin 200. Each seat unit 110 comprises at least a seat 120 and a furniture structure 130. The furniture structure 130 may comprise a console 140, partition and privacy walls 150, a tray table device 160, and not further shown several passenger utility and storage devices or the like. The furniture structure 130 is arranged such that furniture parts at least partially surround the seat 120. Further, the seat unit 110 comprises at least a door assembly 1000. The door assembly 1000 may be attached to a furniture part of the furniture structure 130. For example, in the illustrated embodiment, the door assembly 1000 is mounted to a partition wall 150 of the seat unit 110.

The door assembly 1000 comprises at least a fixed base structure 2000 which may be coupled to a furniture part and/or the seat 120 and/or a cabin floor structure. For example, the base structure 2000 may be a door carrier structure, a bracket or a wall 150, or any such suitable structure for fixedly attaching an object. Further, the door assembly 1000 comprises at least a door 3000 movably mounted on the base structure 2000. The door 3000 is, for example, a panel, a shutter, a screen or the like. The door 3000 is substantially square shaped from a side view. The door 3000 provided herein improves privacy for a passenger of a corresponding seat unit 110 within the cabin 200. The door 3000 is movable between a fully retracted position P1 and at least one deployed position P2. In the shown embodiment, the deployed position P2 is a fully deployed position P2. It is to be understood that the door 3000 can be moved into any position between the fully retracted position P1 and the fully deployed position P2. For example, the door 3000 is lockable by a crew member in its fully retracted position P1. When the door 3000 is unlocked, the door 3000 may remain latched in the fully retracted position P1 until the door 3000 is deployed forward by a passenger of the seat unit 110. In the deployed position P2, the door 3000 may remain unlatched.

The door 3000 is configured to at least partially close a passenger access 300 to the seat 120 providing more privacy to the corresponding passenger. The door assembly 1000 is provided on side of a cabin aisle 210. For example, in the fully retracted position P1 the door 3000 is in a stowed and opened state such that the passenger access 300 provides egress from or ingress to the seat unit 110. In the deployed position P2 more privacy is provided to the passenger seated on the seat 120, wherein the seat 120 is at least partially covered from view.

Figure 2A:
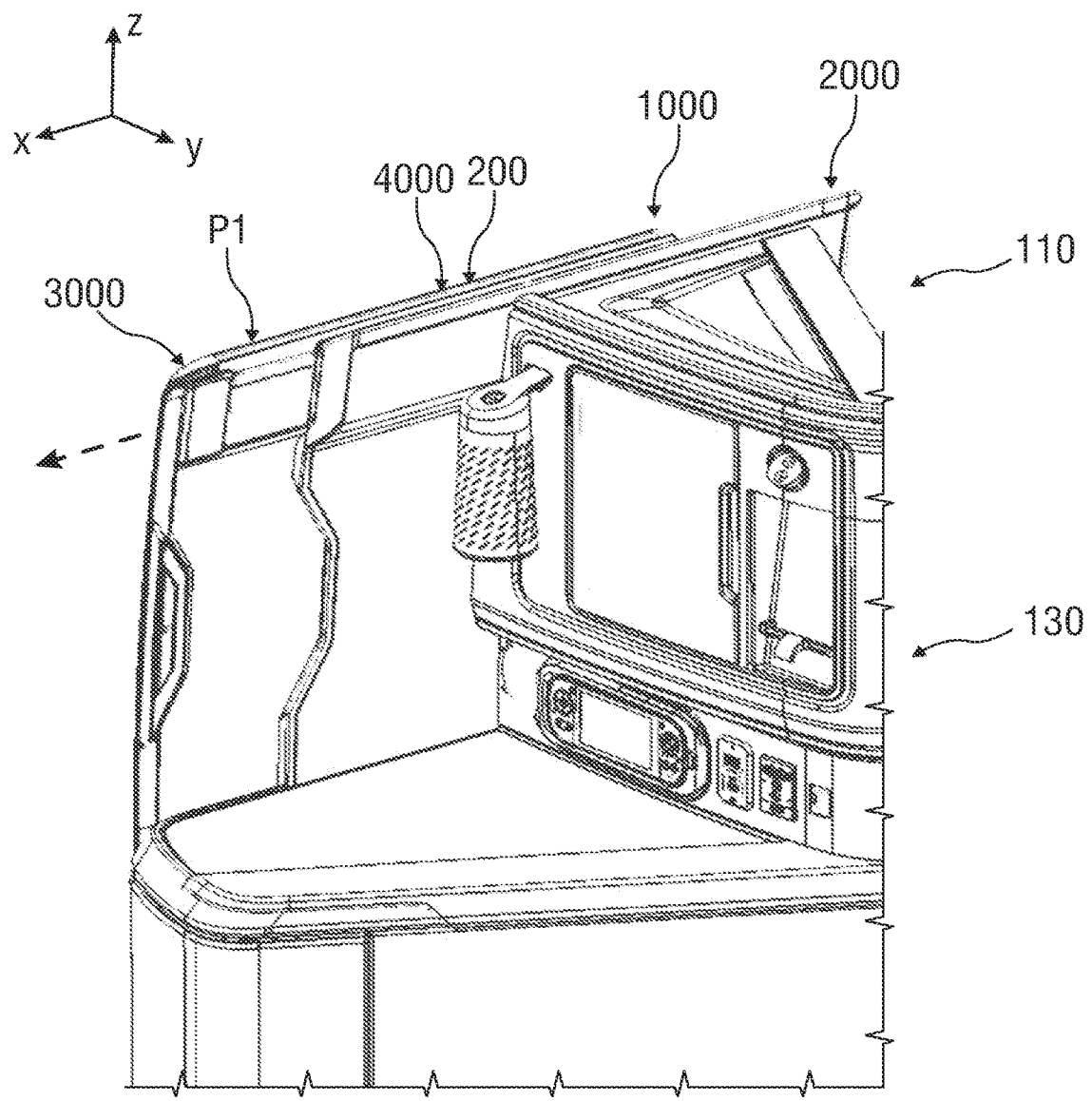
FIGS. 2A to 2D show schematically in perspective views, an embodiment of a door assembly attached to a furniture structure of a seat unit.
Figure 2B:
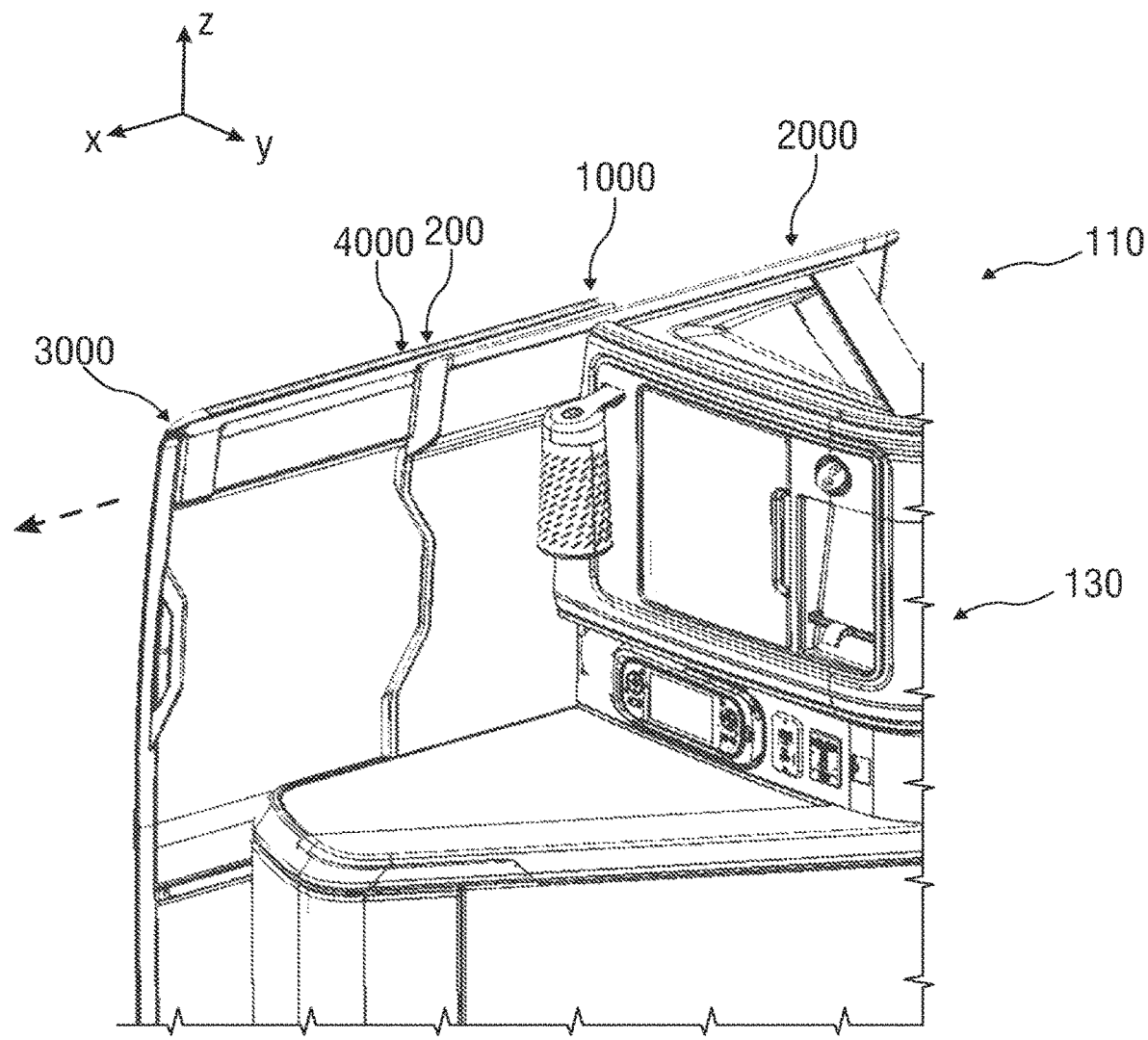
Figure 2C:
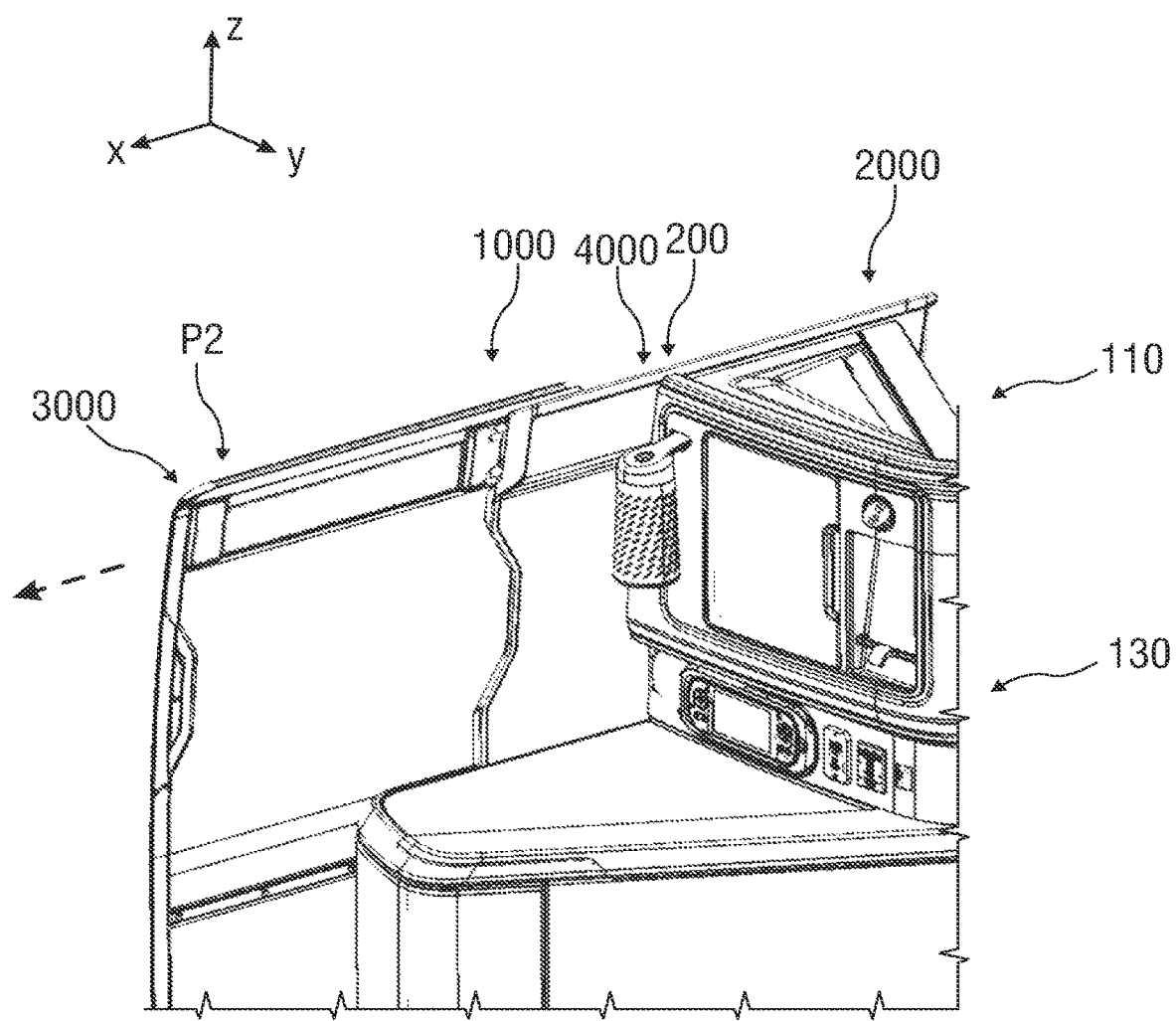
Figure 2D:
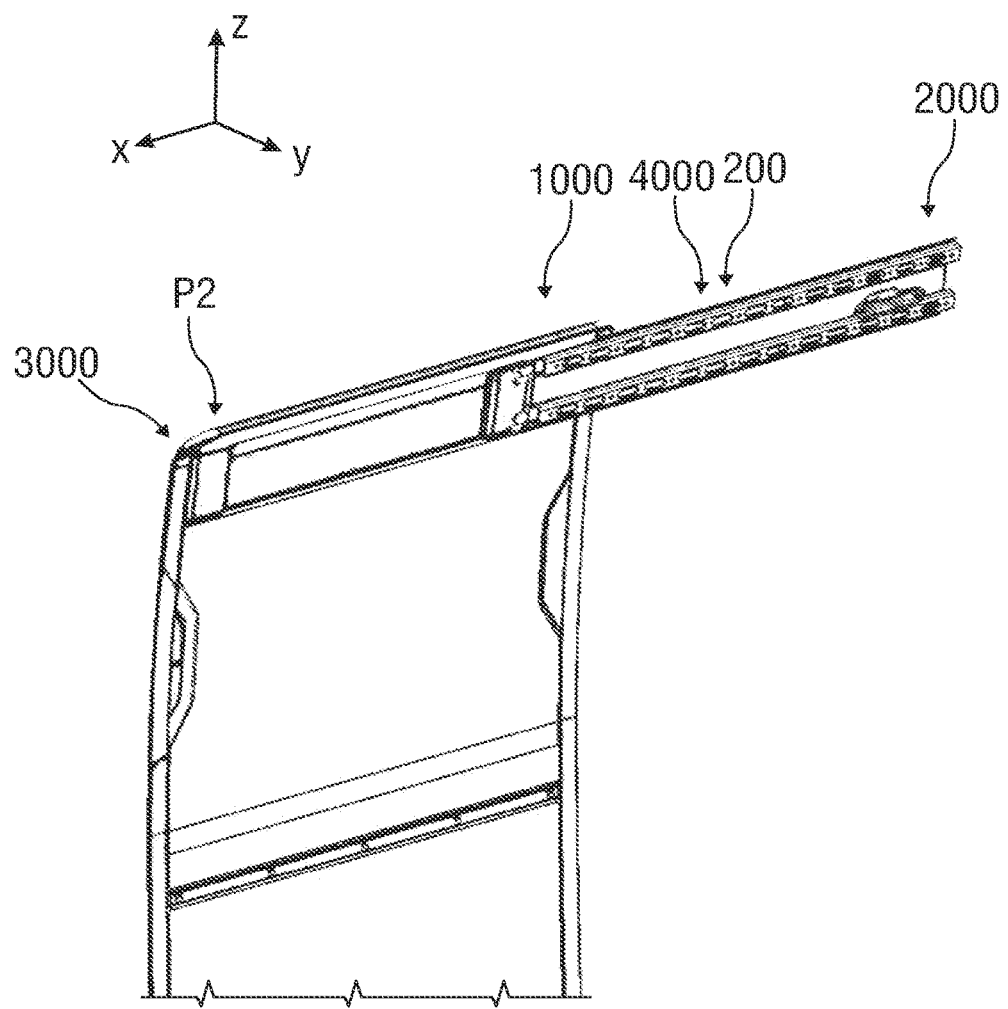

FIGS. 2A to 2D show schematically in perspective views an embodiment of the door assembly 1000 attached to the furniture structure 130 of the seat unit 110, wherein each figure shows the door 3000 in a different position. In particular, FIG. 2A shows the door 3000 in in the fully retracted position P1, FIG. 2B shows the door 3000 in a position moved forward of the fully retracted position P1 and FIG. 2C shows the door 3000 in the fully deployed position P2. FIG. 2D shows the furniture structure 130 partly transparent.

FIGS. 3A to 3D show schematically in enlarged perspective views an embodiment of the door assembly 1000 comprising a door slide device 4000 providing a de-coupling mechanism 400 for a passenger escape path feature. Examples of the decoupling mechanism 400 are best shown in FIGS. 3B to 3D, 4A and 4B, 7A and 7B and 8C. The door slide device 4000 is provided on the base structure 2000 and the door 3000, in particular the door slide device 4000 is configured as a slide connection device, as best shown in FIGS. 2A to 2D, 3A, 5 and 8A and 8B, between the base structure 2000 and the door 3000.

The door slide device 4000 comprises at least a slide support unit 6000 fixed to the base structure 2000, in particular on a side facing the door 3000. The slide support unit 6000 comprises two separate tracks 6001, 6001' which are attached to the base structure 2000. Further, the door slide device 4000 comprises a slide carrier unit 7000 comprising two slide units 7001, 7001'. Each slide unit 7001, 7001' is guided within a respective track 6001, 6001'. The slide carrier unit 7000 is mounted on the door 3000, in particular on a side facing the base structure 2000. The two slide units 7001, 7001' are slidable supported on the base structure 2000 via the slide support unit 6000. The slide carrier unit 7000 comprises at least a fixed slide carrier bracket 7002 fixed on the door 3000, wherein both slide units 7001, 7001' are each separately detachably mounted to the slide carrier bracket 7002. Both slide units 7001, 7001' are fixedly coupled to the slide carrier bracket 7002 in a normal operation state of the door 3000. The slide units 7001, 7001' are configured identically in this example. Movement of the slide units 7001, 7001' along the slide support unit 6000 is executed substantially parallel to each other in the normal operation state of the door 3000. Each slide unit 7001, 7001' is coupled to the slide carrier bracket 7002 via a detachable joint mechanism 7003, 7003'.

In case of jamming one of the slide units 7001, 7001', the exemplary shown, jammed slide unit 7001' de-couples from the slide carrier bracket 7002, wherein the door 3000 is slidable supported on the other still functional slide unit 7001. Particularly, the door slide device 4000 provides a simple de-coupling mechanism 400. For example, when the jammed slide unit 7001' is de-coupled from the slide carrier bracket 7002, the door 3000 is slidable guided on the base structure 2000 via the remaining functional slide unit 7001.

In particular, the jammed slide unit 7001' remains in the jammed position on the slide support unit 6000, in particular in the corresponding track 6001' after decoupling and even when the door 3000 is moved from the deployed position P2 to the fully retracted position P1. The jammed slide unit 7001' is thereby not functional anymore. Each detachable joint mechanism 7003, 7003' comprises a detachable detent element 7004, 7004' and a corresponding detent receiving element 7005, 7005' detachably retaining the detent element 7004, 7004'. For example, the detachable detent element 7004, 7004' is a detent pin 7006, as best shown in FIGS. 3C and 3D, and the detent receiving element 7005, 7005' is a detent hole 7007, recess, notch or the like, as best shown in FIG. 3D, into which the detent element 7004, 7004' is detachable inserted and retained in a normal operation state of the door 3000.

In the illustrated example, the detent pin 7006 is fixedly secured in an elongated hole 7008 formed on the corresponding slide unit 7001, 7001'. Each detent pin 7006 projects partially from the slide unit 7001, 7001' out of the elongated hole 7008. Each detent pin 7006 is secured in the corresponding detent hole 7007 in the normal state as best shown in FIG. 3C. The detent element 7004, 7004' is arranged fixedly attached to the slide unit 7001, 7001'. The receiving element 7005, 7005' is arranged fixedly attached on the slide carrier bracket 7002 by means of a housing. When the slide unit 7001' de-couples from the slide carrier bracket 7002, the detent element 7004' attached to the jammed slide unit 7001' is pulled out of its receiving element 7005', leaving the door 3000 still retained on the other slide unit 7001 and so as on the slide support unit 6000, in particular on the track 6001. For example, when the detent element 7004' is pulled free, a passenger or a crew member can simply continue to open the door 3000 with a normal operation force until sufficient space for egress is achieved. For example, the detent pin 7006 of the slide unit 7001' is being moved out of the corresponding detent hole 7007 as best shown in FIG. 3D.

Figure 3A:
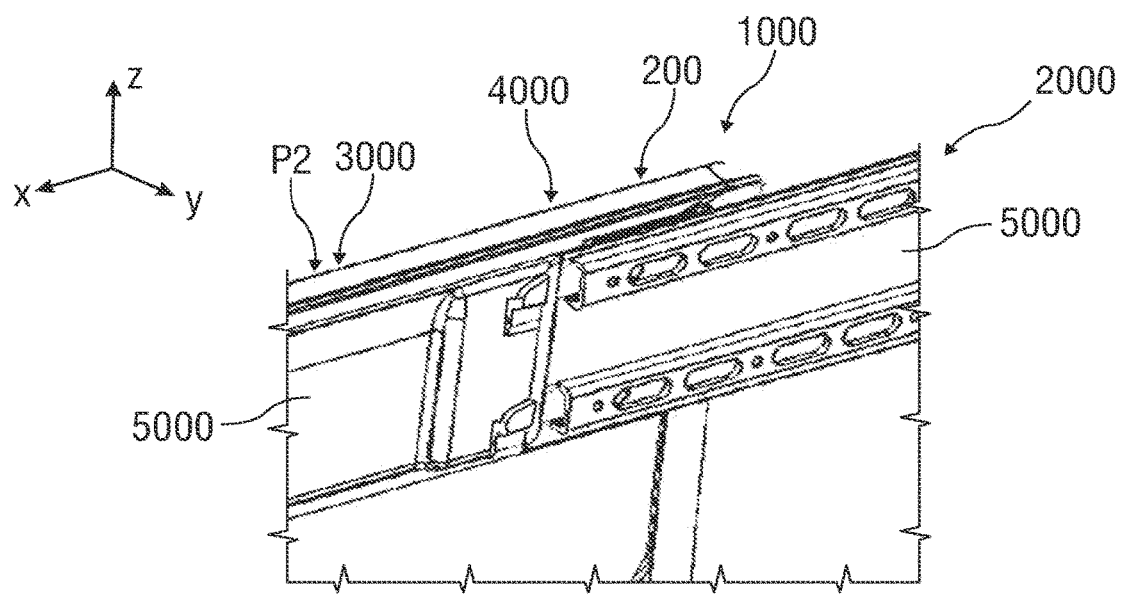
FIGS. 3A to 3D show schematically in enlarged perspective views, an embodiment of a door assembly comprising a door slide device providing a de-coupling mechanism for a passenger escape path feature.
Figure 3B:
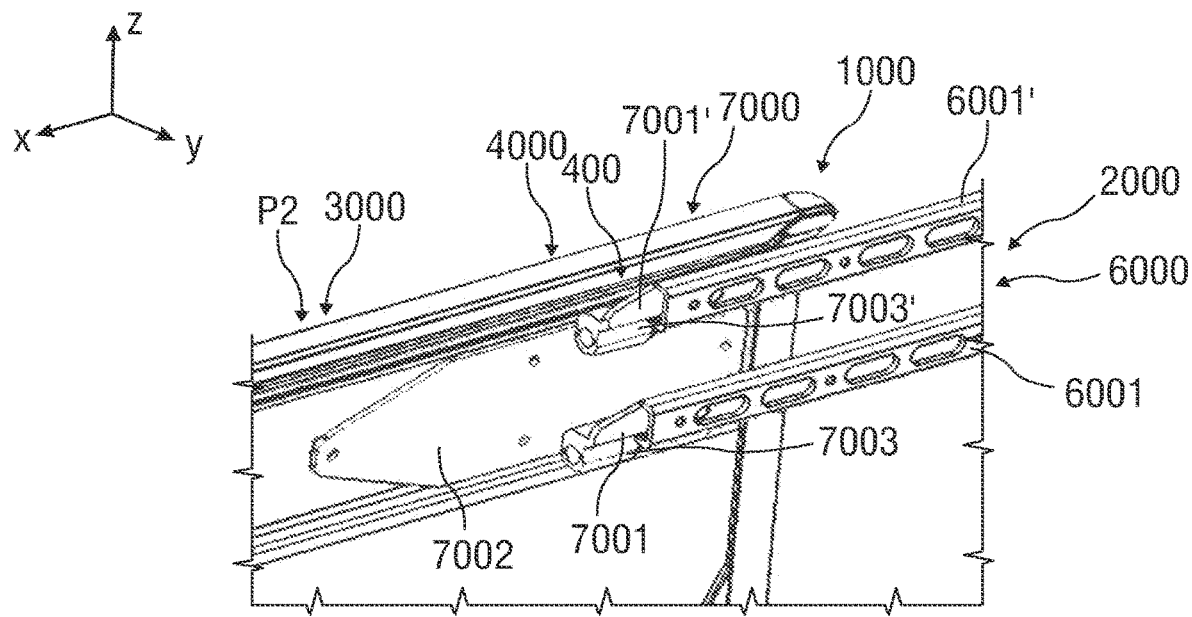
Figure 3C:
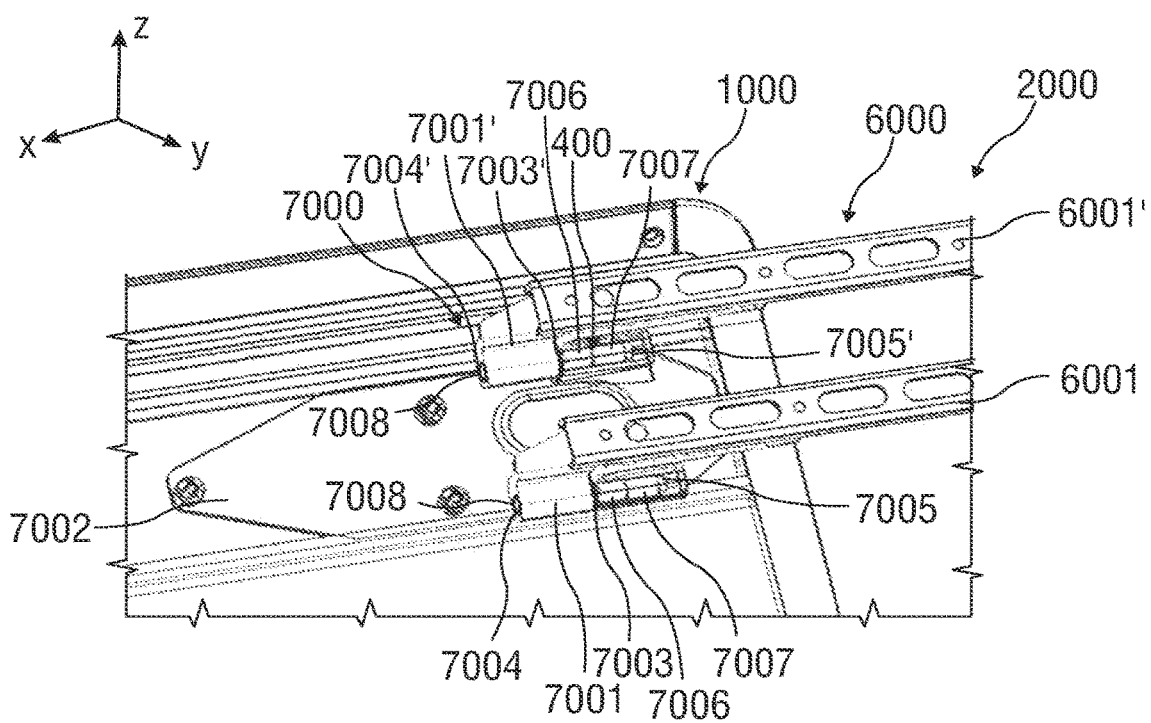
Figure 3D:
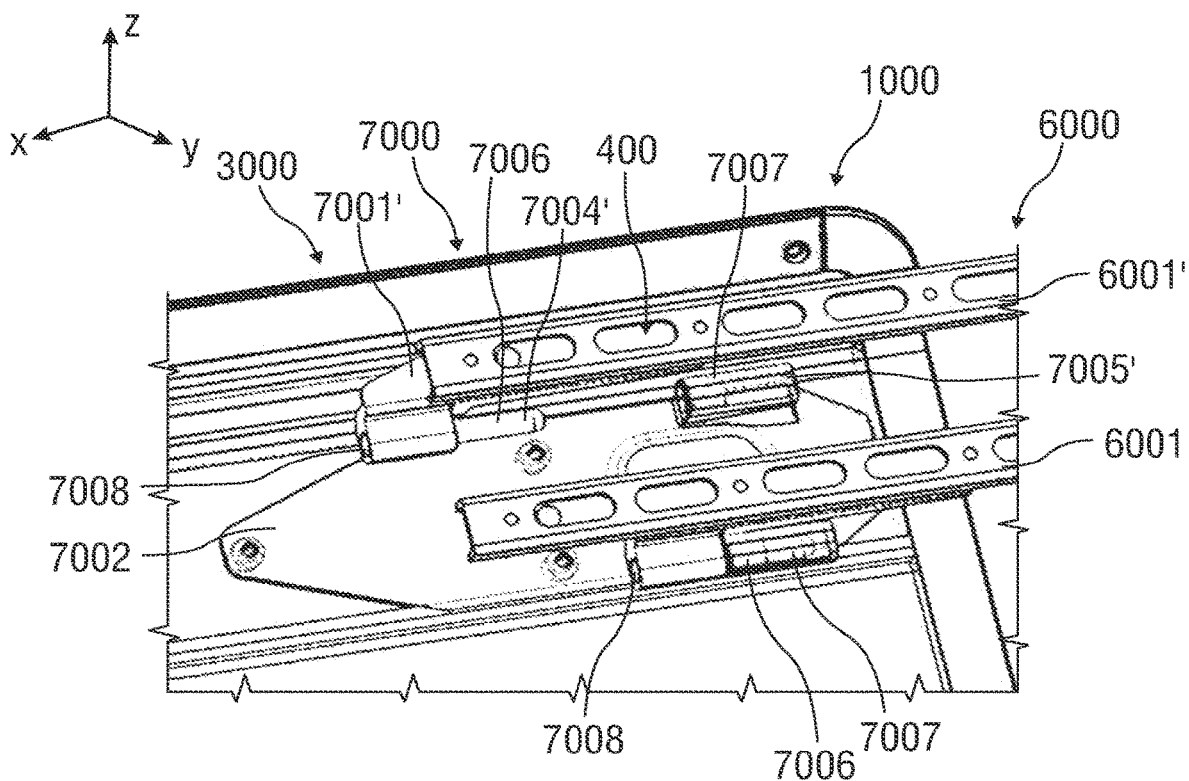

In particular, FIG. 3A shows the door assembly 1000 with some structure covering elements 5000, such as cover plates or mechanism shrouds and FIG. 3B shows the door assembly 1000, for example in a normal operation state of the door 3000, without the structure covering elements 5000 for a more detailed view of the door slide device 4000. FIGS. 3C and 3D, each shows a sequence of the de-coupling mechanism when one of the slide units 7001, 7001' is jammed, wherein in FIG. 3C the slide unit 7001' is jammed or broken or has a malfunction and in FIG. 3D the slide unit 7001' is already de-coupled from the slide support unit 6000 enabling a further movement of the door 3000.

Figure 5:
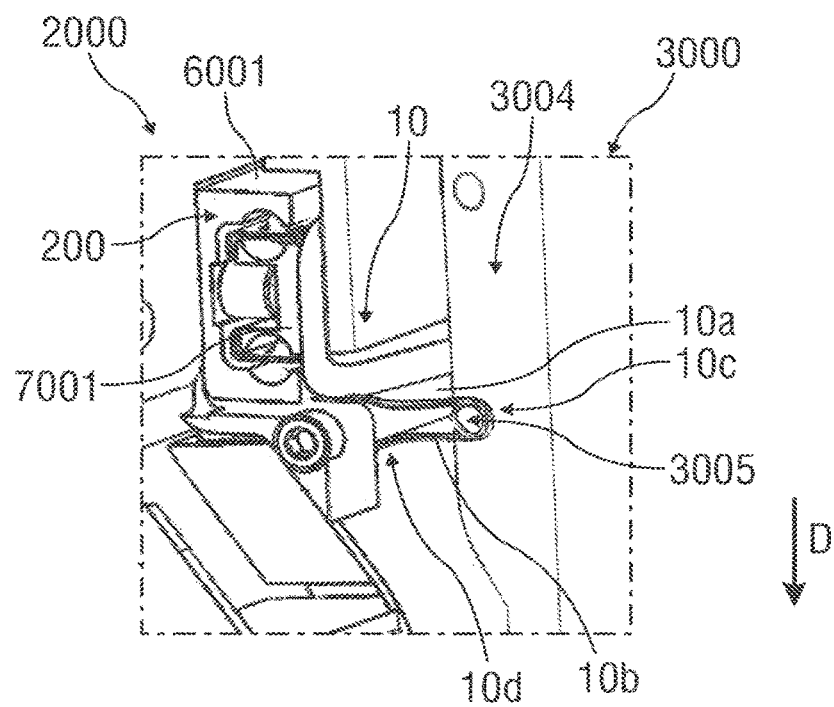
FIG. 5 shows schematically in enlarged perspective view, an embodiment an additional separate auxiliary slide arrangement for a passenger escape path feature.

In case of both slide units 7001, 7001', the slide carrier bracket 7002 and/or the slide support unit 6000, e.g. its tracks 6001, 6001', are/is jammed or if there is only one slide unit 7001 or 7001' provided by the door assembly 1000, the door slide device 4000 comprises an additional and separate auxiliary slide arrangement 10 as seen in FIG. 5 in more detail.

Figure 4A:
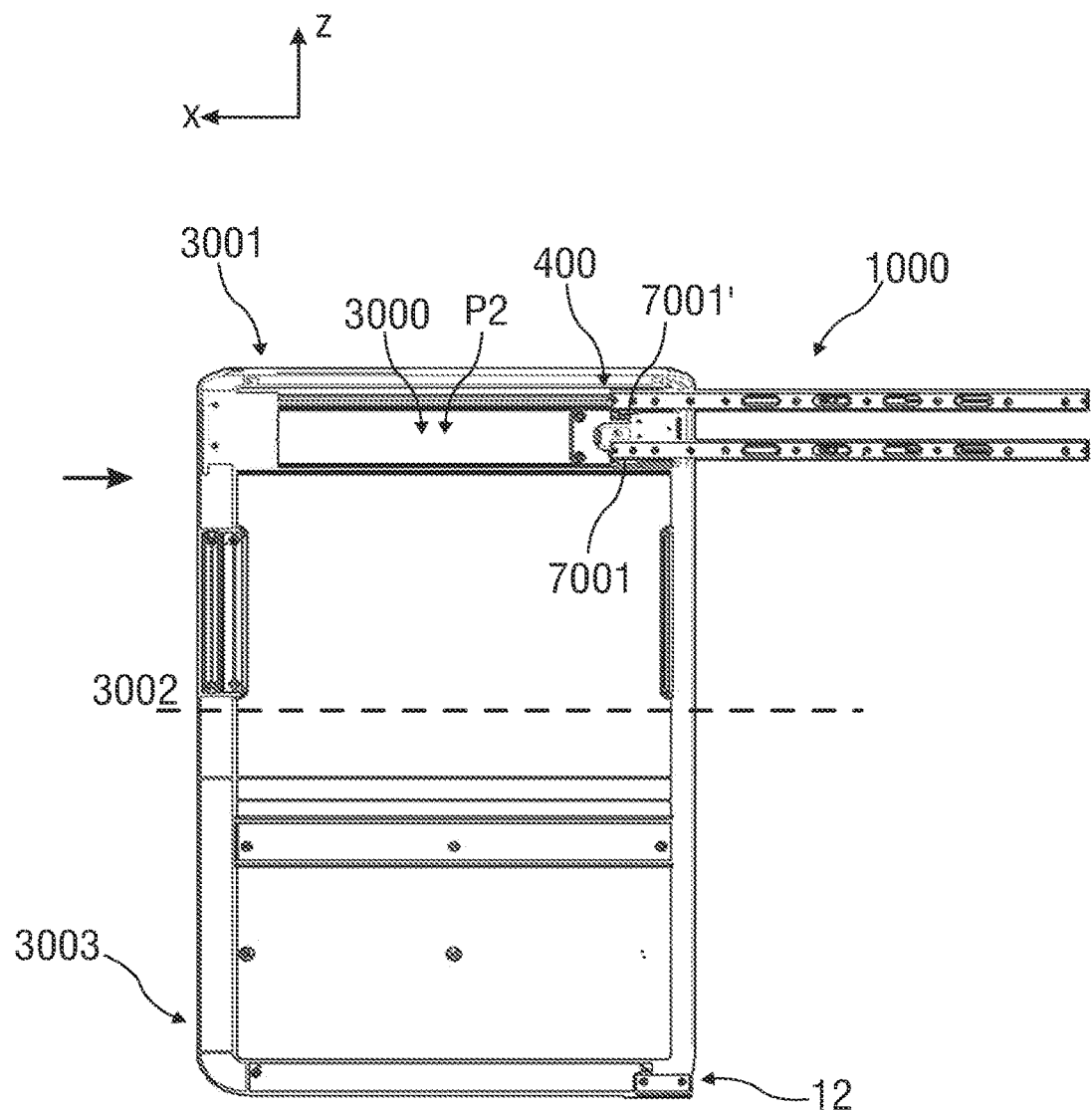
FIGS. 4A and 4B show schematically in a rear views, an embodiment of a door assembly comprising a door slide device having an additional separate auxiliary slide arrangement for a passenger escape path feature.

FIG. 4A shows a case in which both slide units 7001, 7001' are jammed or broken, in particular blocked in such manner that the door 3000 cannot be further moved relative to the base structure 2000. The movement of the door 3000 is blocked in the deployed position P2. To de-couple both slide units 7001, 7001' a force exertion on the door 3000 higher than a normal operation force is required which can be exerted on the door 3000 by pushing or pulling the door 3000 in a closing direction, which means towards the base structure 2000. In case of de-coupling of the slide units 7001, 7001' from the slide carrier bracket 7002 via the force exertion on the door 3000, the door 3000 is movably supported on the separate auxiliary slide arrangement 10. In the normal operation mode the separate auxiliary slide arrangement 10 does not provide any specific function to a sliding function of the door 3000 relative to the base structure 2000.

Figure 4B:
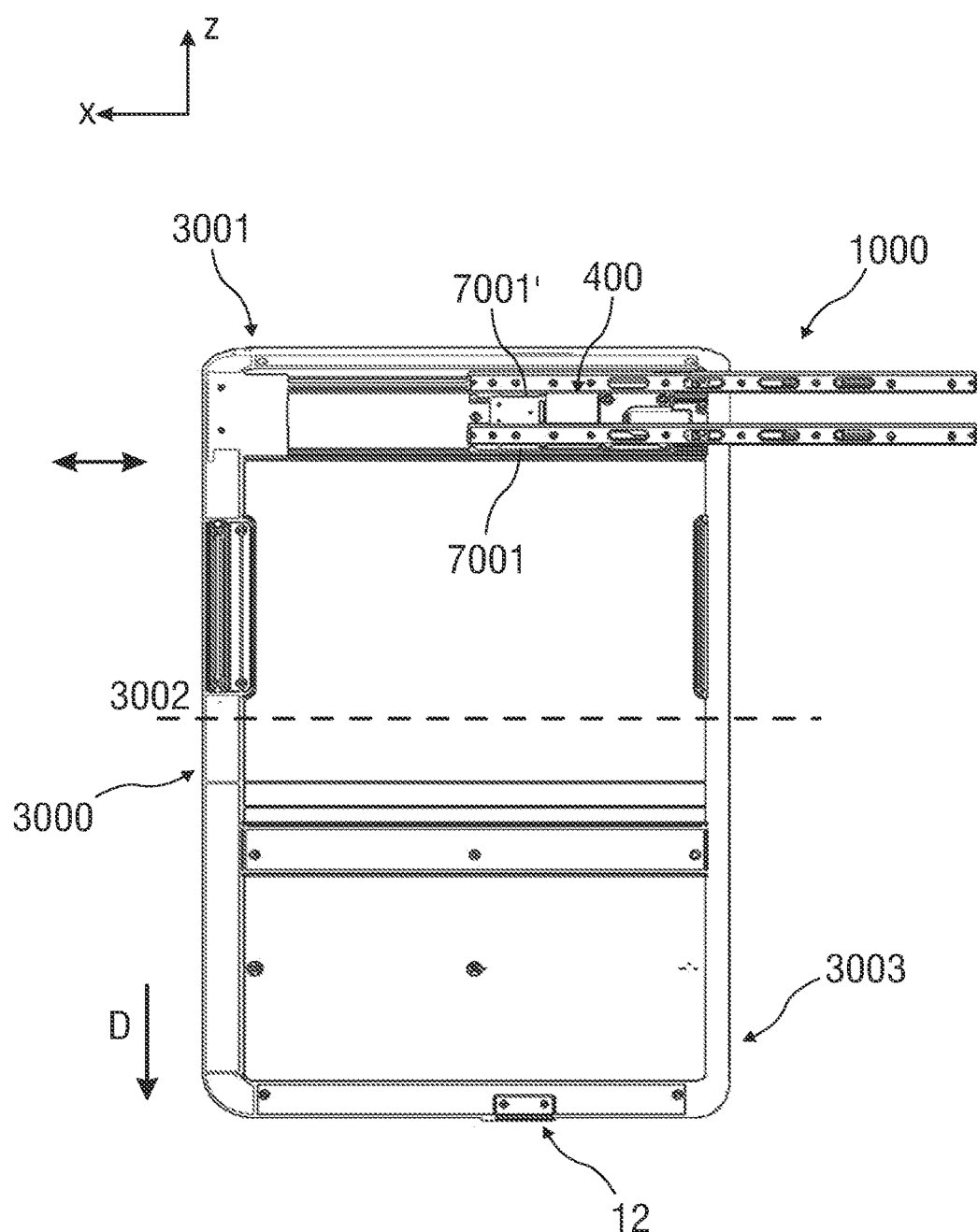

FIG. 4B shows slide units 7001, 7001' fully separated from the slide carrier bracket 7002. To ensure that the door 3000 is restrained from falling into the cabin aisle CA, the separate auxiliary slide arrangement 10 is provided between the base structure 2000 and the door 3000. In a de-coupled state of the slide units 7001, 7001', the separate auxiliary slide arrangement 10 is configured to function as an auxiliary slide mechanism which supports the door 3000 further on the base structure 2000. The door 3000 will rely on the separate auxiliary slide arrangement 10 for supporting during an emergency escape event.

In the de-coupled state of the slide units 7001, 7001' from the slide carrier bracket 7002, the door 3000 is separated from the base structure 2000 and shifts in a direction D towards a vehicle floor, wherein the separate auxiliary slide arrangement 10 is configured to hold the door 3000 relative to the base structure 2000 in a slidable manner. Any injuries or damages to passengers, crew members and vehicle furniture are avoided when the door 3000 is hold relative to the base structure 2000 even in case of fully de-coupling of a main slide mechanism. The separate auxiliary slide arrangement in particular in form of an auxiliary slide mechanism, is configured to support the door 3000 slidable on the base structure 2000.

The separate auxiliary slide arrangement 10 is arranged below or above the pair of slide units 7001, 7001'. For example, the auxiliary slide arrangement 10 is arranged in an upper area 3001 of the door 3000 as exemplarily shown in FIGS. 4A and 4B. For example, the auxiliary slide arrangement 10 is arranged in an area above a centerline 3002 of the door 3000 as exemplarily shown in FIGS. 4A and 4B. Therefore, a shift movement of the door 3000 when the slide units 7001, 7001' are fully separated from the slide carrier bracket 7002 is controlled in such manner that the door 3000 is prevented from swinging too far into the cabin aisle 210. For additional support in a lower area of the door 3000, a lower guide 12 is provided in the lower area of the door 3000. The lower guide 12 is configured to support the door 3000 relative to the auxiliary slide arrangement in a vertical direction. The lower guide 12 may be mounted to the base structure 2000 and/or to the door 3000. The lower guide 12 may engage with a bottom edge 3003 of the door 3000, as exemplarily shown in FIGS. 4A and 4B, and keep the door 3000 in a predetermined height. The lower guide 12 comprises a step or flap protruding from the base structure 2000 in a direction towards the door 3000 and on which the bottom edge 3003 of the door 3000 is supported on when shifting towards the vehicle floor.

FIG. 5 shows the auxiliary slide arrangement 10 in an enlarged view. The separate auxiliary slide arrangement 10 comprises at least one guide bar 10a and a retaining element 10b which is guided along the guide bar 10a. In particular, FIG. 5 shows the door assembly 1000 in a normal operation mode. The shown slide unit 7001 is functionally guided within the track 6001. The guide bar 10a is mounted to the base structure 2000 and the retaining element 10b is mounted to the door 3000. For example, each end of the guide bar 10a is fixed to a bracket 12.

In the shown embodiment, the bracket 12 is arranged below the lower track 6001. The retaining element 10b is fixed to a lateral side 3004 of the door 3000. For example, the lateral side 3004 comprises a fixation point 3005 to which one end 10c of the retaining element 10b is mounted to. The fixation point 3005 may be provided by a common not further shown fixation element such as a screw, a clip, a bolt or the like. In the normal operation mode of the door 3000, the retaining element 10b is guided along the guide bar 10*a* in a substantially contactless manner. Thereby, in the normal operation mode the retaining element 10*b* is noiselessly guided along the guide bar 10*a*.

In a de-coupled state of the slide units 7001, 7001' from the slide carrier bracket 7002, the door 3000 shifts in a direction towards the vehicle floor (in the shown embodiment in a downward direction), wherein the retaining element 10*b* is configured to hold the door 3000 relative to the base structure 2000 by coming into slidable engagement with the guide bar 10*a*.

The guide bar 10*a* is substantially tube shaped in the illustrated example. The guide bare 10*a* may be coated with a common damping material, such as synthetic material. The retaining element 10*b* comprises one end 10*c* fixedly attached or detachably attached to the door 3000 and a second end 10*d* which is substantially shaped as a hook, loop or ring corresponding to an outer shape of the guide bar 10*a*. The retaining element 10*b* is configured as an auxiliary retention wire. The retaining element 10*b* is, for example, configured as a one-piece spring. Each end 10*c*, 10*d* may comprise a number of windings.

In this example, when the door 3000 shifts in the downward direction D, the retaining element 10*b* is in retaining engagement with the guide bar 10*a* to retain the door 3000 slidable on the base structure 2000 and as close as possible to the base structure 2000.

Figure 6:
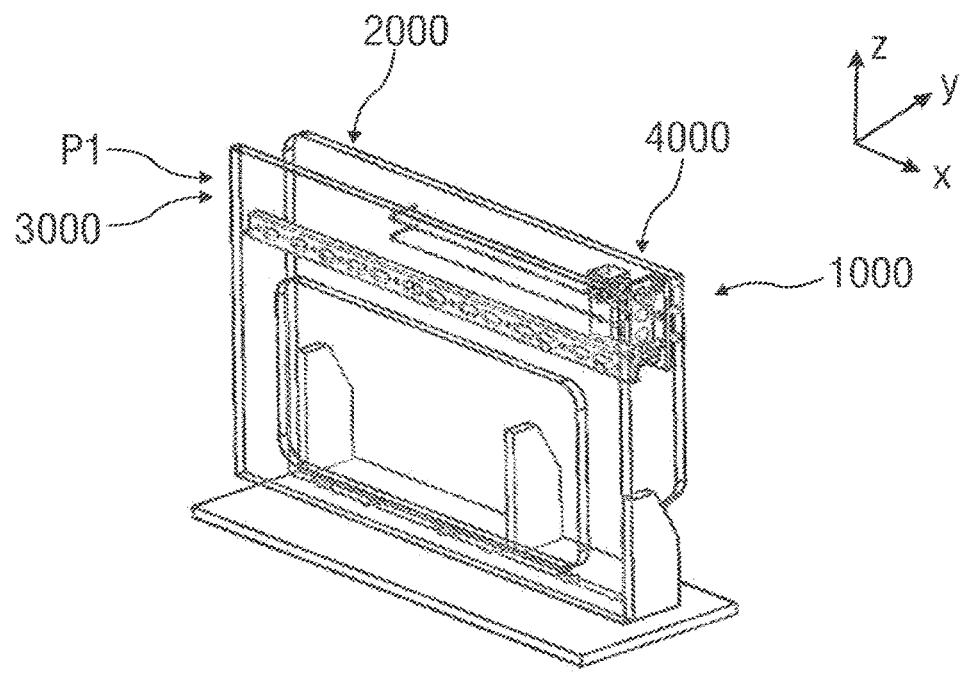
FIG. 6 shows schematically in perspective view an embodiment, of a door assembly comprising a door slide device providing a de-coupling mechanism for a passenger escape path feature.

FIG. 6 shows schematically in perspective view an embodiment of a door assembly 1000 comprising a door slide device 4000 providing a de-coupling mechanism 400 for a passenger escape path feature.

Figure 7A:
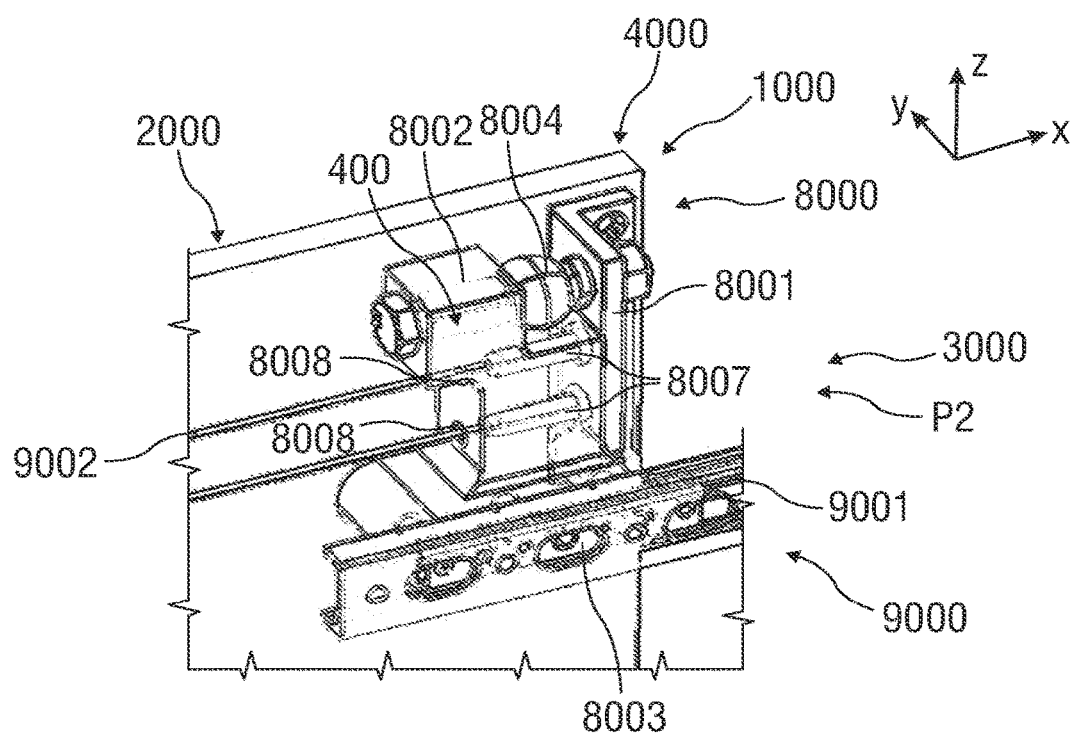
FIGS. 7A and 7B show schematically in enlarged perspective views, an embodiment of a door slide device of a door assembly providing a de-coupling mechanism for a passenger escape path feature.
Figure 7B:
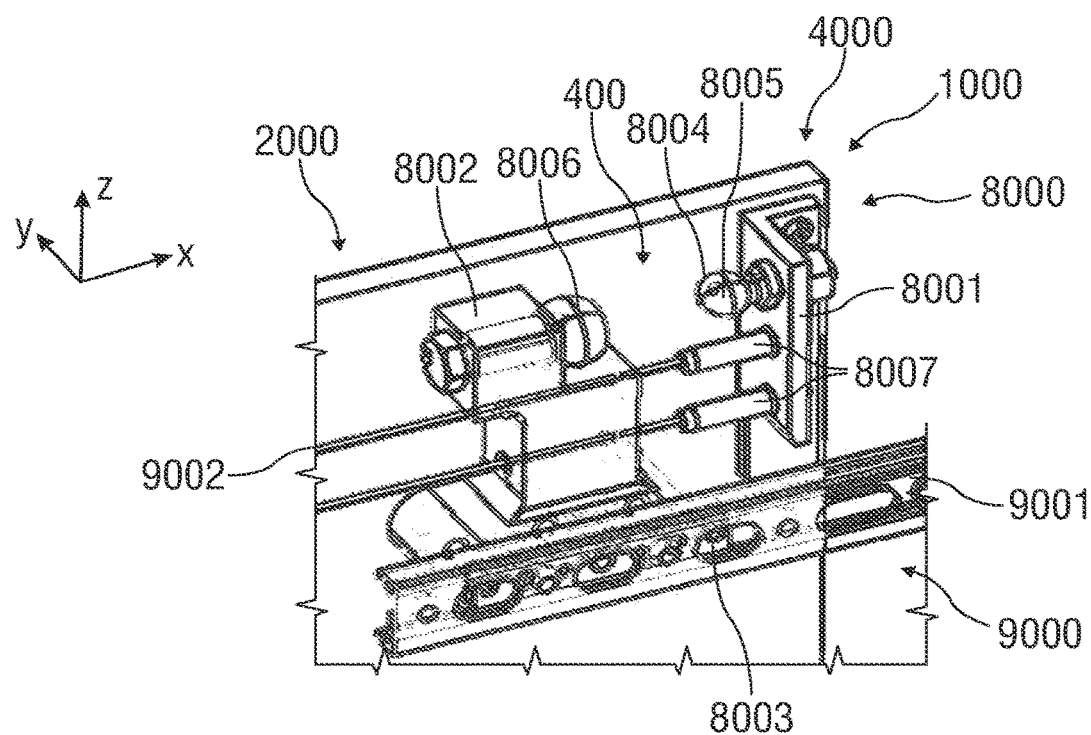
Figure 8A:
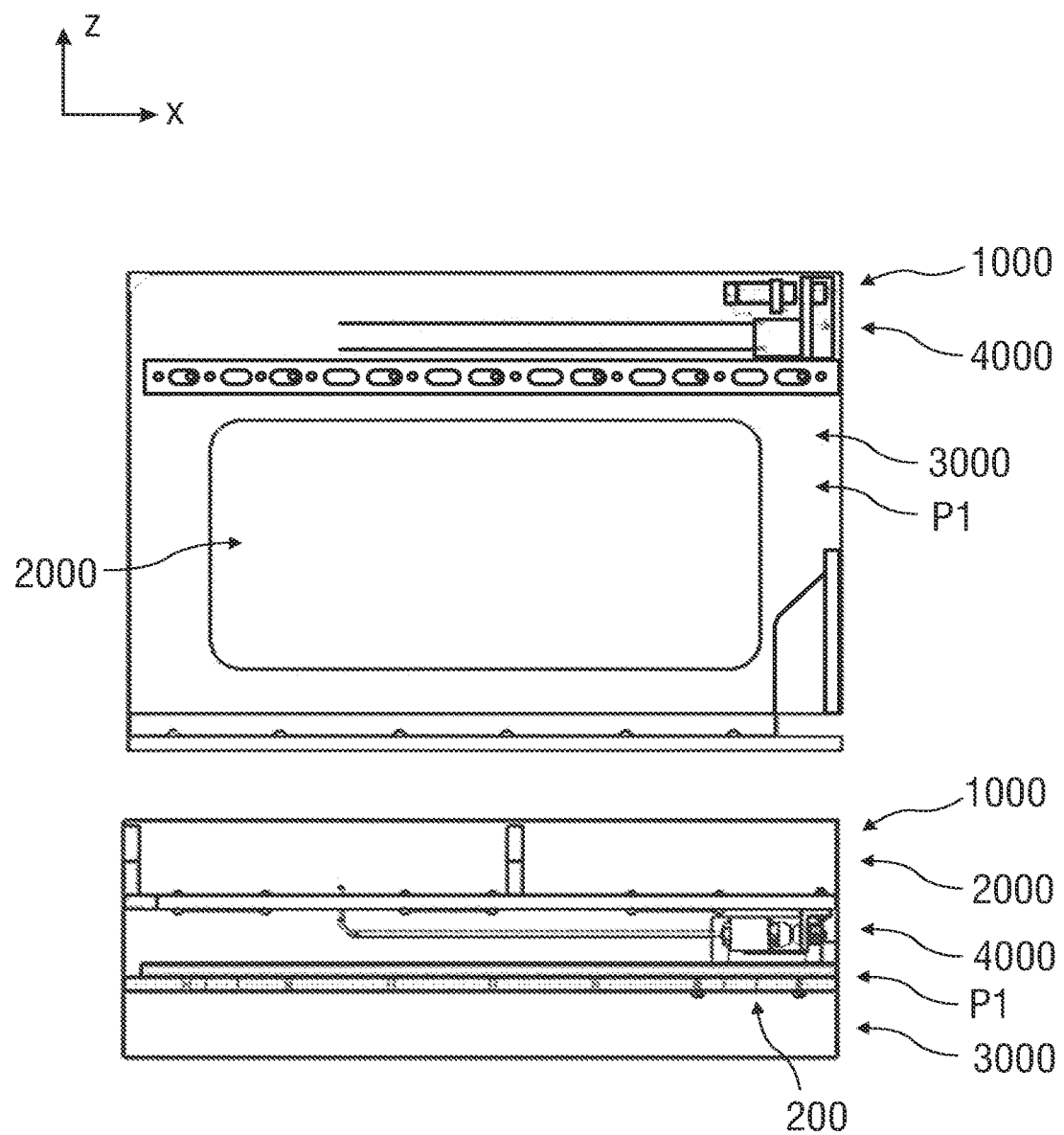
FIGS. 8A to 8D show schematically in side views and corresponding plan views an embodiment of a door assembly comprising a door slide device providing a de-coupling mechanism for a passenger escape path feature.
Figure 8B:
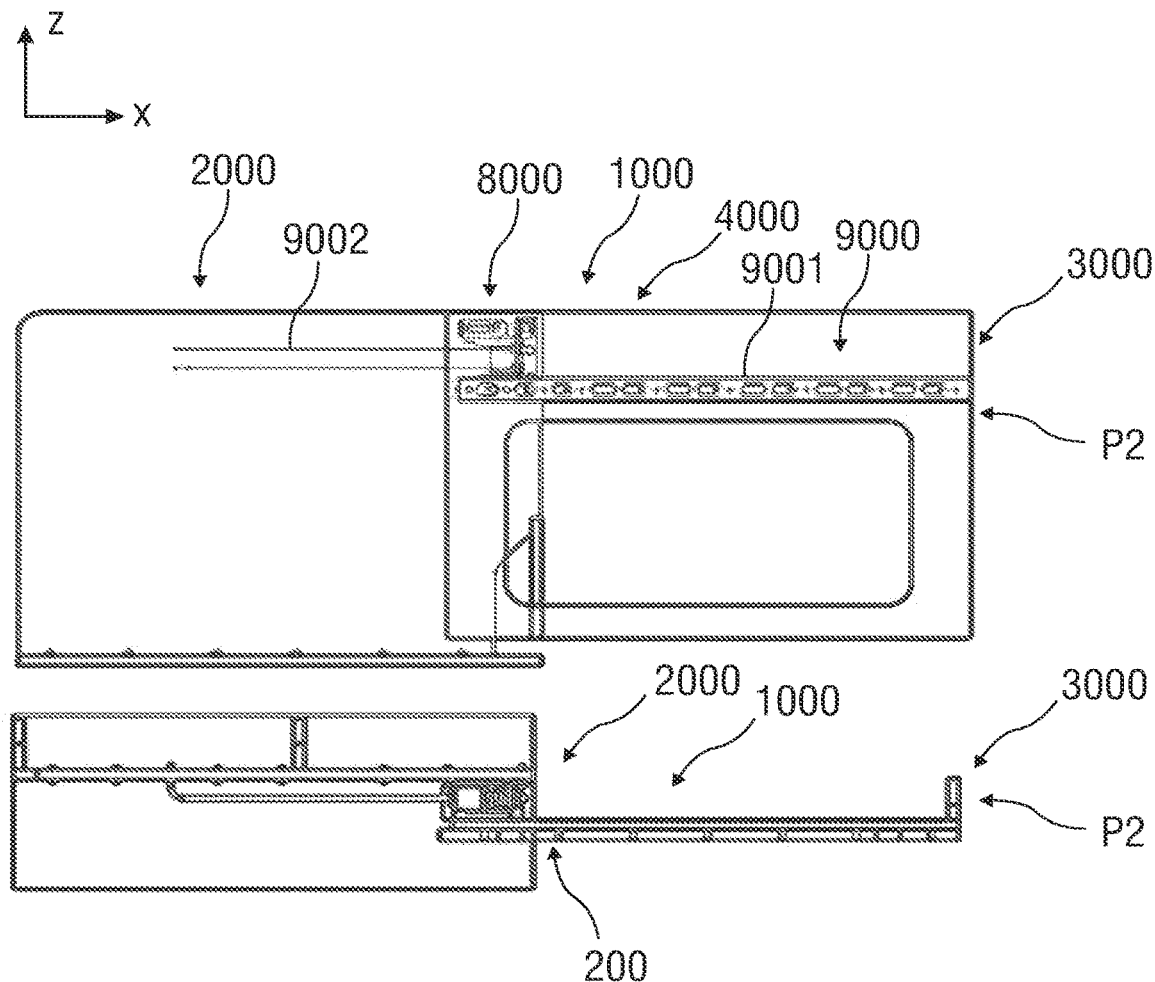
Figure 8C:
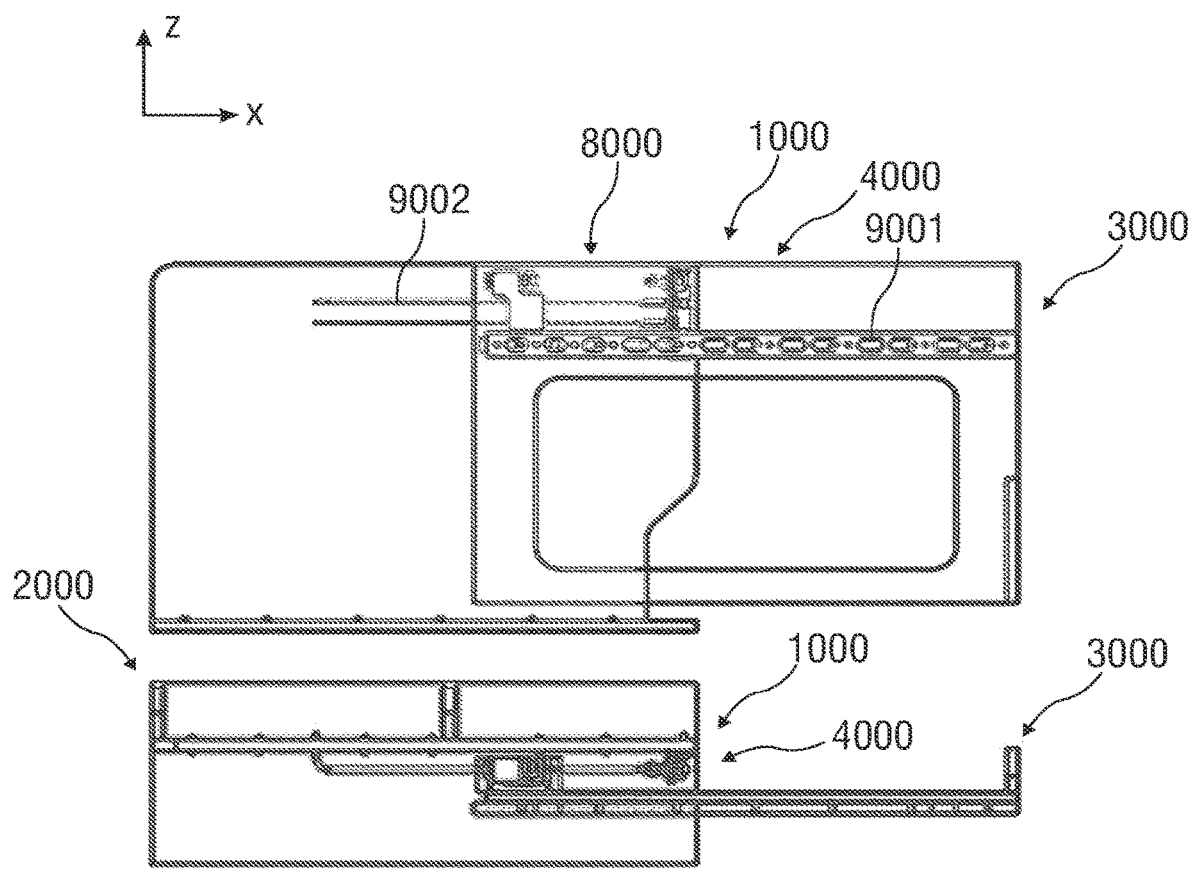
Figure 8D:
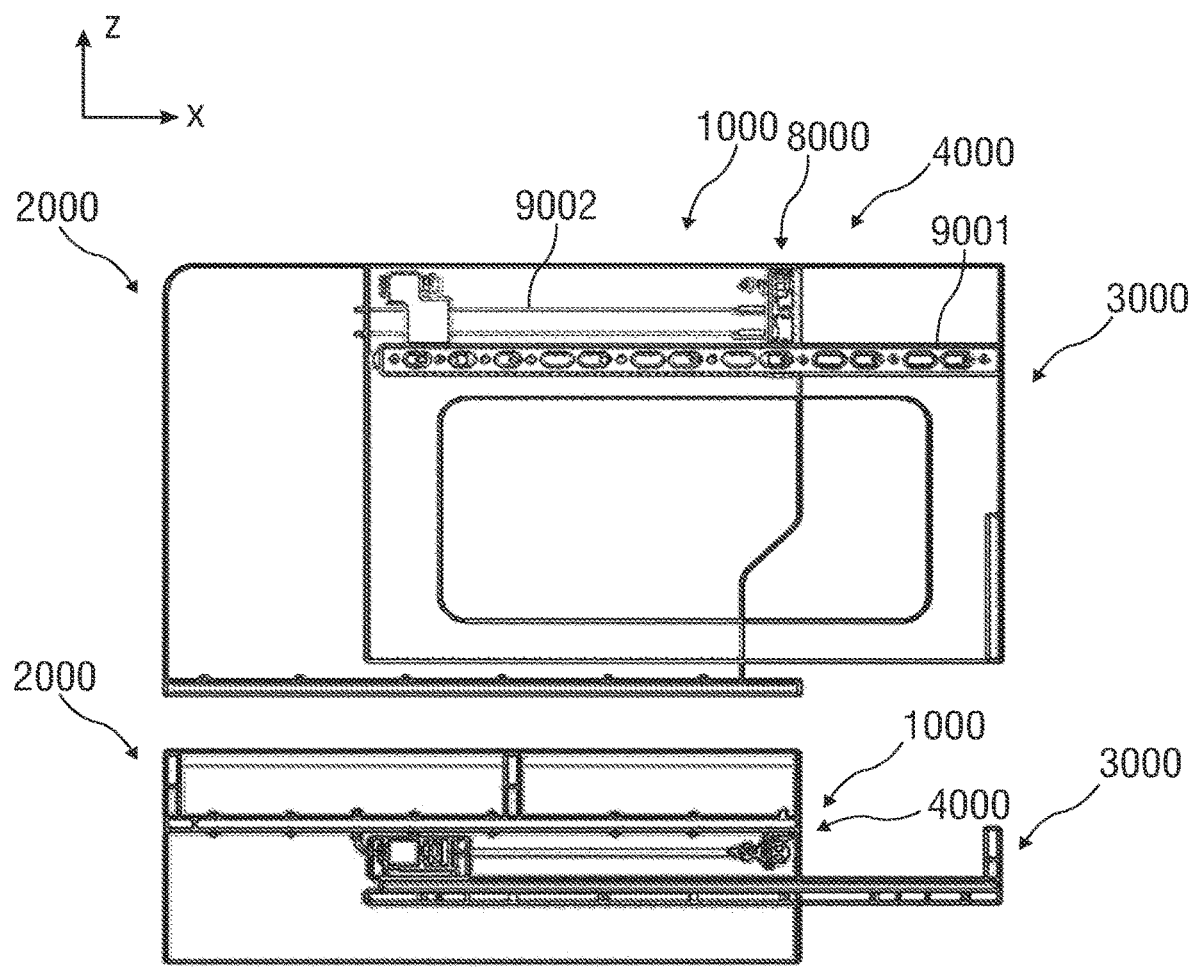

FIGS. 7A and 7B show schematically in enlarged perspective views an embodiment of a door slide device 4000 of the door assembly 1000 as shown in FIG. 6 providing a de-coupling mechanism 400 for a passenger escape path feature. The door slide device 4000 comprises a slide carrier unit 8000 fixed to the base structure 2000, in particular on a side facing the door 3000. The slide carrier unit 8000 comprises a fixed slide carrier bracket 8001 fixed to the base structure 2000. Further, the slide carrier unit 8000 comprises a slide carrier member 8002 detachably mounted to the slide carrier bracket 8001. The slide carrier member 8002 is immovably fixed to the slide carrier bracket 8001 in a normal operation state of the door 3000.

Moreover, the door slide device 4000 comprises a slide support unit 9000 comprising two slide units 9001, 9002. In the shown embodiment, the slide unit 9001 is fixed to the door 3000, which is hidden in the shown FIGS. 7A and 7B, and the other slide unit 9002 is fixed to the base structure 2000. Wherein movement of the door 3000 is achieved by the slide unit 9001 which is fixed to the door 3000 and is slidable supported on the slide carrier member 8002 in a normal operation of the door 3000. In case of jamming of the slide unit 9001 fixed to the door 3000, said jammed slide unit 9001 de-couples from the slide carrier bracket 8001 and the door 3000 is slidable supported on the slide unit 9002 fixed to the base structure 2000. In particular, the slide carrier member 8002 de-couples from the slide carrier bracket 8001. The slide unit 9001 is configured as a track and the slide unit 9002 comprises at least one rod-like guide. In the shown embodiment, the slide unit 9002 comprises two rod-like guides.

The slide carrier member 8002 provides a sliding guide 8003 on which the slide unit 9001 on side of the door 3000 is slidable guided. In a normal operation state of the door 3000, the slide unit 9001 which is fixed to the door 3000 slides along the sliding guide 8003, in particular on the slide carrier member 8002. The slide carrier member 8002 is slidable supported on the slide unit 9002 fixed to the base structure 2000 such that in case of jamming the slide unit 9001 on side of the door 3000, the slide carrier member 8002 de-couples from the slide carrier bracket 8001 whereupon the slide carrier member 8002 is movable along the slide unit 9002 fixed to the base structure 2000. Either the sliding guide 8003 is jammed in the slide unit 9001 on side of the door 3000 or the slide unit 9001 is damaged such that it is immovably stuck on the sliding guide 8003.

For example, the slide carrier member 8002 is detachably mounted to the slide carrier bracket 8001 via a detachable joint mechanism 8004. The detachable joint mechanism 8004 comprises at least a detachable detent element 8005 and a corresponding detent receiving element 8006 detachably retaining the detent element 8005. For example, the detachable detent element 8005 is a detent ball and the detent receiving element 8006 is a detent hole 7007, recess, notch or the like into which the detent element 8005 is detachable inserted and retained in a normal state. The detent element 8005 is arranged fixedly attached on the slide carrier bracket 8001 and the receiving element 8006 is arranged fixedly attached on the slide carrier member 8002. A diameter of the slide unit 9002, in particular of the rod-like guides, is lower than supporting pins 8007 provided on the slide carrier bracket 8001 which are arranged enclosed in through holes 8.8 of the slide carrier member 8002 in a normal operation state of the door 3000. Thereby, jamming of the slide unit 9002 and/or the slide carrier unit 8000 is prevented. Further, the supporting pins 8007 fits to bushes to provide a sliding fit so that corrosion is prevented.

FIGS. 8A to 8D show schematically in side views and corresponding plan views an embodiment of the door assembly 1000 as described in FIGS. 6 to 7B. In particular, each figure shows a process sequence of the de-coupling mechanism 400 when the slide unit 9001 on side of the door 3000 is jammed. To additionally support the shown door 3000 on the base structure 2000, the door assembly 1000 comprises the separate auxiliary slide arrangement 10 according to FIG. 5.

Figure 9:
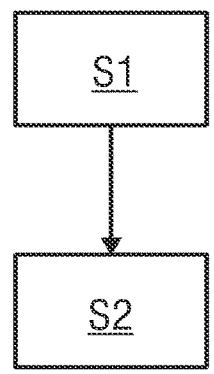
FIG. 9 shows schematically a flow chart of a method for de-coupling a door assembly of a seat unit provided within a vehicle cabin.

FIG. 9 shows schematically a flow chart of a method of de-coupling a door assembly of 1 a seat unit 110 provided within a vehicle cabin 200, wherein the method comprises at least two steps S1 and S2. For example, the door assembly 1000 comprises at least a fixed base structure 2000 which may be coupled to a furniture part and/or the seat 120 and/or a cabin floor structure. Further, the door assembly 1000 comprises at least a door 3000 such as a panel movably mounted on the base structure 2000. The door 3000 provided herein improves privacy for a passenger of a corresponding seat unit 120 within the cabin 200. The door 3000 is movable between a fully retracted position P1 and at least one deployed position P2. The door assembly 1000 further comprises two slide units 7001, 7001' which are each separately detachably mounted to a slide carrier bracket 7002 of the door assembly 1000, and a separate auxiliary slide arrangement 10. A first step S1 refers to exerting a force higher than a normal operation force on the door 3000 when positioned in the deployed position P2; wherein the force is exerted on the door 3000 in a closing direction until the slide units 7001, 7001' are decoupled from the slide carrier bracket 7002. A second step S2 refers to moving the door 3000 from the deployed position P2 into the retracted position P1 on the separate auxiliary slide arrangement 10, wherein the door 3000 is supported on the separate auxiliary slide arrangement 10.

With reference now to FIG. 10, the apparatus 1100 is provided. As shown in FIG. 10, an example of the apparatus 1100 is a flying apparatus 1101, such as an aerospace vehicle, aircraft, air cargo, flying car, satellite, planetary probe, deep space probe, solar probe, and the like. As also shown in FIG. 10, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 10 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 11:
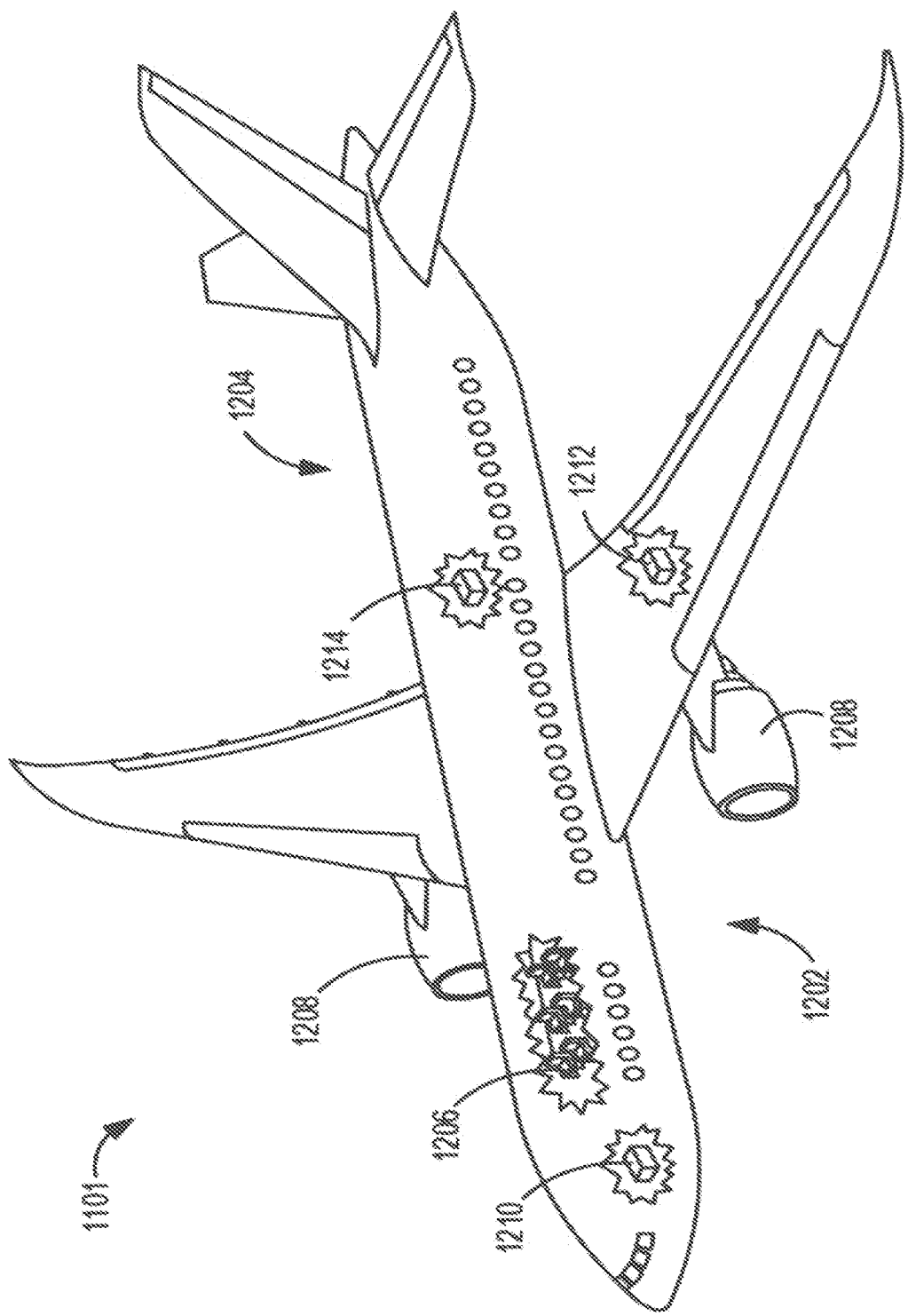
FIG. 11 is a schematic perspective view of a particular flying apparatus in accordance with an example.

With reference now to FIG. 11, a more specific diagram of the flying apparatus 1101 is depicted in which an implementation of the disclosure is advantageously employed. In this example, the flying apparatus 1101 is an aircraft produced by the apparatus manufacturing and service method and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Further, the disclosure comprises embodiments according to the following clauses:

Clause 1. A door assembly for a seat unit provided within a vehicle cabin, the door assembly comprising at least:
  a fixed base structure;
  a door movably mounted on the base structure and movable between a retracted position and at least one deployed position; and
  a door slide device between the base structure and the door to movably support the door on the base structure, the door slide device comprising:
    a slide carrier bracket fixed to the base structure or the door,
    at least one slide unit which is coupled to the slide carrier bracket, and
    at least one auxiliary slide arrangement configured such that the door is movably supported on the separate auxiliary slide arrangement.

Clause 2. The door assembly according to clause 1, wherein the separate auxiliary slide arrangement is configured to hold the door relative to the base structure in a slidable manner at least in case of de-coupling of the slide unit from the slide carrier bracket.

Clause 3. The door assembly according to clause 1 or 2, wherein the at least one separate auxiliary slide arrangement is arranged below or above the slide unit.

Clause 4. The door assembly according to any one of the preceding clauses, wherein the separate auxiliary slide arrangement comprises at least one guide bar and a retaining element which is guided along the guide bar.

Clause 5. The door assembly according to clause 4, wherein the guide bar is mounted to the base structure and the retaining element is mounted to the door.

Clause 6. The door assembly according to clause 4 or 5, wherein the retaining element is mounted on a lateral side of the door.

Clause 7. The door assembly according to any one of the clauses 4 to 6, wherein in the normal operation mode of the door, the retaining element is guided along the guide bar in a substantially contactless manner.

Clause 8. The door assembly according to any one of the clauses 4 to 7, wherein in a de-coupled state of the slide unit from the slide carrier bracket, the door shifts in a direction towards a vehicle floor, wherein the retaining element is configured to hold the door relative to the base structure by coming into slidable engagement with the guide bar.

Clause 9. The door assembly according to any one of the clauses 4 to 8, wherein the retaining element comprises one end mounted to the door and a second end which is substantially shaped as a hook, loop or ring.

Clause 10. The door assembly according to any one of the clauses 4 to 9, wherein the retaining element is configured as an auxiliary retention wire.

Clause 11. The door assembly according to any one of the clauses 4 to 10, wherein the guide bar is substantially tube shaped.

Clause 12. The door assembly according to any one of the preceding clauses, wherein the slide carrier bracket is fixed on the door and the slide unit is detachably fixed on the slide carrier bracket.

Clause 13. The door assembly according to any one of the preceding clauses, wherein the door slide device comprises a slide support unit fixed to the base structure.

Clause 14. The door assembly according to clause 13, wherein the slide support unit comprises at least one track and the slide unit is slidable guided on the track in the normal operation mode.

Clause 15. The door assembly according to any one of the preceding clauses, wherein the slide unit is coupled to the slide carrier bracket via a detachable joint mechanism comprising a detachable detent element and a corresponding detent receiving element detachably retaining the detent element.

Clause 16. The door assembly according to clause 15, wherein the slide unit comprises an elongated hole for fixedly securing the detachable detent element to the slide unit.

Clause 17. The door assembly according to clauses 15 or 16, wherein the detent element is configured as a detent pin and the detent receiving element is configured as a detent hole.

Clause 18. The door assembly according to clause 1, wherein both slide units are de-coupled via a force exertion on the door higher than a normal operation force, wherein said force exertion is exerted on the door by pushing or pulling the door in a closing direction Clause 19. A seat unit for a vehicle cabin, in particular an aircraft cabin, comprising at least a seat and a furniture structure at least partially surrounding the seat and a door assembly according to any one of the preceding clauses 1 to 18.

Clause 20. A method for de-coupling a door assembly of a seat unit provided within a vehicle cabin according to any one of the preceding clauses 1 to 18, comprising:
exerting a force higher than a normal operation force on the door when positioned in the deployed position; wherein the force is exerted on the door in a closing direction until the slide unit is de-coupled from the slide carrier bracket; and
moving the door from the deployed position into the retracted position on the separate auxiliary slide arrangement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A door assembly for a seat unit provided within a vehicle cabin, the door assembly comprising:
    a door movable between a retracted position and at least one deployed position; and
    a door slide device to movably support the door, the door slide device including:
        a slide carrier bracket coupled to the door;
        a slide carrier unit having at least one slide unit coupled to the slide carrier bracket;
        a slide support unit having at least one track, the at least one slide unit engaged with the at least one track; and
        at least one auxiliary slide arrangement to support the door when the door is decoupled from the door slide device, the at least one auxiliary slide arrangement comprising at least one guide bar distinct from the at least one track and a retaining element configured for movement along the at least one guide bar.

2. The door assembly of claim 1, wherein the slide support unit comprises a second track separate from the at least one track.

3. The door assembly of claim 1, wherein the at least one slide unit is configured for movement within the at least one track.

4. The door assembly of claim 3, wherein the at least one slide unit is configured to decouple from the slide carrier bracket in response to a jamming of the at least one slide unit in the at least one track.

5. The door assembly of claim 1, further comprising a detachable joint mechanism to detachably mount the at least one slide unit to the slide carrier bracket.

6. The door assembly of claim 5, wherein the detachable joint mechanism comprises a detachable detent element and a corresponding detent receiving element configured to detachably retain the detachable detent element.

7. The door assembly of claim 6, wherein:
    the detachable detent element comprises a detent pin; and
    the detent receiving element comprises a detent hole into which the detachable detent element is detachably retained in a normal operation state of the door.

8. The door assembly of claim 1, wherein the retaining element is configured for movement along the guide bar when the door is decoupled from the door slide device.

9. A vehicle cabin, comprising
    a seat unit;
    a door assembly for the seat unit, the door assembly including:
        a door movable between a retracted position and at least one deployed position; and
        a door slide device to movably support the door, the door slide device including:
            a slide carrier bracket coupled to the door;
            a slide carrier unit having at least one slide unit coupled to the slide carrier bracket;
            a slide support unit having at least one track, the at least one slide unit engaged with the at least one track; and
            at least one auxiliary slide arrangement to support the door when the door is decoupled from the door slide device, the at least one auxiliary slide arrangement comprising at least one guide bar distinct from the at least one track and a retaining element configured for movement along the at least one guide bar.

10. The vehicle cabin of claim 9, wherein the slide support unit comprises a second track separate from the at least one track.

11. The vehicle cabin of claim 9, wherein the at least one slide unit is configured for movement within the at least one track.

12. The vehicle cabin of claim 11, wherein the at least one slide unit is configured to decouple from the slide carrier bracket in response to a jamming of the at least one slide unit in the at least one track.

13. The vehicle cabin of claim 9, further comprising a detachable joint mechanism to detachably mount the at least one slide unit to the slide carrier bracket.

14. The vehicle cabin of claim 13, wherein the detachable joint mechanism comprises a detachable detent element and a corresponding detent receiving element configured to detachably retain the detachable detent element.

15. The vehicle cabin of claim 14, wherein:
    the detachable detent element comprises a detent pin; and
    the detent receiving element comprises a detent hole into which the detachable detent element is detachably retained in a normal operation state of the door.

16. The vehicle cabin of claim 9, wherein the retaining element is configured for movement along the guide bar when the door is decoupled from the door slide device.

17. A seat unit for a vehicle cabin, the seat unit comprising:
    a seat;
    a furniture structure at least partially surrounding the seat; and
    a door assembly including:
        a door movable between a retracted position and at least one deployed position; and
        a door slide device to movably support the door, the door slide device including:
            a slide carrier bracket coupled to the door;
            a slide carrier unit having at least one slide unit coupled to the slide carrier bracket;
            a slide support unit having at least one track mounted to the furniture structure, the at least one slide unit engaged with the at least one track; and
            at least one auxiliary slide arrangement to support the door when the door is decoupled from the door slide device, the at least one auxiliary slide arrangement comprising at least one guide bar distinct from the at least one track and a retaining element mounted to the door and configured for movement along the at least one guide bar.

18. The seat unit of claim 17, wherein the slide support unit comprises a second track separate from the at least one track.

19. The seat unit of claim 17, wherein the at least one slide unit is configured for movement within the at least one track.

20. The seat unit of claim 19, wherein the at least one slide unit is configured to decouple from the slide carrier bracket in response to a jamming of the at least one slide unit in the at least one track.

* * * * *